United States Patent

Adams

[15] 3,657,603
[45] Apr. 18, 1972

[54] RELAY CONTROL RESPONSIVE TO OVERVOLTAGE AND UNDERVOLTAGE

[72] Inventor: William M. Adams, 746 Oak Lane, Bryan, Tex. 77801

[22] Filed: July 24, 1970

[21] Appl. No.: 57,965

[52] U.S. Cl. ............................317/16, 317/31, 317/33 C, 317/36 TD, 317/22, 317/51, 317/141 S, 317/142 TD
[51] Int. Cl. ......................................H02h 3/20, H02h 3/12
[58] Field of Search......................317/22, 31, 33, 16, 36 TD, 317/49, 50, 141 S, 142 R, 142 TD, 51

[56] References Cited

UNITED STATES PATENTS

| | | | |
|---|---|---|---|
| 3,320,493 | 5/1967 | Culbertson | 317/31 X |
| 2,854,615 | 9/1958 | Light | 317/31 X |
| 3,493,838 | 2/1970 | Gyugi | 323/DIG. 2 |
| 3,487,284 | 12/1969 | Cady | 320/DIG. 2 |
| 3,122,697 | 2/1964 | Kauders | 317/22 X |

Primary Examiner—J. D. Miller
Assistant Examiner—Harvey Fendelman
Attorney—Berman, Davidson and Berman

[57] ABSTRACT

A line voltage guard circuit having a network including neon lamps, resistor-capacitor timing branches, diodes and transistors, the network being connected to a switching relay to control the availability of the supply line voltage to apparatus utilizing same and to disconnect the supply line from the apparatus when the line voltage is either below a bottom limit for a definite length of time or above a top limit. The circuit automatically reconnects the line to the apparatus a predetermined time after the supply voltage returns to a value between the top and bottom limits.

7 Claims, 4 Drawing Figures

PATENTED APR 18 1972　　3,657,603

INVENTOR.
WILLIAM M. ADAMS,
BY
Berman, Davidson & Berman,
ATTORNEYS.

RELAY CONTROL RESPONSIVE TO OVERVOLTAGE AND UNDERVOLTAGE

This invention relates to line voltage guard circuits, and more particularly to a device for the protection of electrical apparatus from damage due to low and high levels of line voltage.

Most electrical apparatus intended to operate directly from either commercial or private voltage sources is designed to function normally with reasonable variations in source voltage. However, there are many reasons whereby this source voltage can become too low or high for normal operation, resulting in costly electrical failures. For example, in using step-up transformer circuitry, high values of line voltage may result in operating voltage levels that exceed maximum voltage ratings.

Due to increased line loading, some electrical apparatus may be damaged by low levels of line source voltage. The present invention, utilizing the source voltage as its own power source, samples the level of source voltage present, compares it to regulated reference levels, and protects the electrical apparatus from being damaged by excessively high or excessively low source voltage conditions.

It is an object of the present invention to provide continuous sampling of low, normal and high source voltage levels, regardless of the "on" or "off" status of the protected electrical apparatus.

It is another object of the present invention to provide an improved means for disconnecting the protected electrical apparatus from damage that could result from a source voltage that continues below a preset level for a predetermined period of time.

It is a still further object of the present invention to provide a means for disconnecting the protected electrical apparatus from a source voltage that reaches a level above a preset high limit.

It is another object of the present invention to provide a means to automatically reconnect the protected electrical apparatus to the source of supply voltage, after a predetermined period of time, only when the source voltage is between preset low and high voltage limits.

It is a still further object of the present invention to provide an improved line voltage guard circuit which can operate from either alternating current or direct current voltage sources.

With these and other objects in view, the present invention contemplates the use of transistor circuits and neon glow tube voltage reference and timing circuits a well-known characteristic of a gas-filled glow tube, such as a neon lamp, is that ionization and de-ionization occur at two different voltage levels. These different levels provide a unique characteristic that permits well-defined reference levels, a certain amount of circuit hysteresis and, if desired, visual indications of the state of the voltage source, providing novel and important features in the invention. Power for operation of these circuits is taken from the source line voltage. Low and high voltage sampling circuits are provided separately to permit accurate limit levels to be established. Contained within these circuits are provisions for delayed operation that further protects the electrical apparatus. When desired, a magnetic switch may be included either as an integral part of the device of the present invention or maybe an existing component of the protected electrical apparatus.

Other objects and advantages of the invention will become apparent from the following description and claims, and from the accompanying drawings, wherein:

Figure 1:
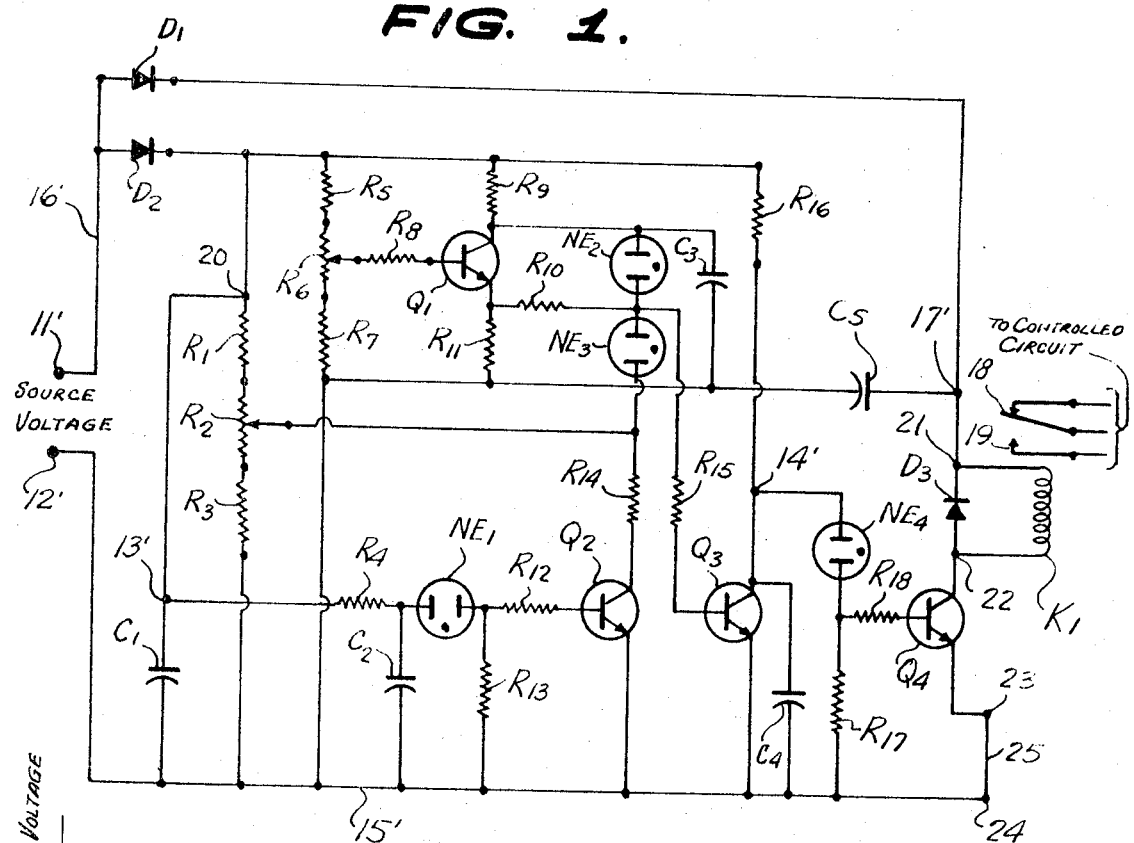
FIG. 1 is a schematic diagram of a low and high source voltage sampling device that protects electrical apparatus in accordance with the principles of the present invention.

Referring to FIG. 1, assume that an alternating current voltage source of 90 to 130 volts RMS is applied to the terminals $11'$ and $12'$, designated as "source voltage." A diode $D_2$ and a capacitor $c_1$ are connected in series to rectify and filter this source alternating current voltage to provide a DC voltage at $13'$ for the transistor and neon glow lamp circuits. The level of this DC voltage will vary with variations of the applied source voltage level.

As shown in FIG. 1, the resistor $R_{16}$ and the capacitor $C_4$ form a RC circuit which can develop a voltage at a junction point $14'$ for energizing a neon lamp $NE_4$. Said RC circuit delays the ionization of the neon glow lamp $NE_4$ because of the time required for charging the capacitor $C_4$. Thus, as shown in FIG. 1, it will be seen that the aforesaid RC circuit comprising $R_{16}$ and capacitor $C_4$ is connected in series between the point $13'$ and a line wire $15'$ and that the neon glow lamp $NE_4$ is connected between the junction $14'$ and the line wire $15'$ through a resistor $R_{17}$. The delay of ionization of the neon glow lamp $NE_4$ provides an "on delay" time to permit "sampling" by other circuitry of the applied source voltage.

Figure 2:
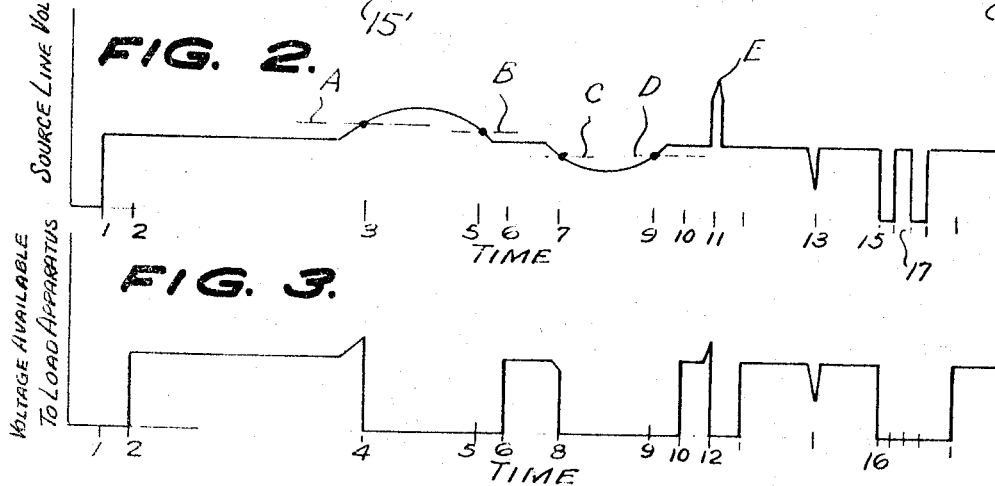
FIG. 2 is a graph showing typical variations of the RMS values of source voltage with respect to time.

Consider now the source voltage as shown at the time point 1 of FIG. 2. Ionization of lamp $NE_4$ after the "delay" time will result in forward bias being developed across the series resistor $R_{17}$ and applied to the base of a transistor $Q_4$ through a current limiting resistor $R_{18}$. Transistor $Q_4$ conducts at a saturated level, energizing a relay $K_1$ with direct current supplied from the rectifier $D_1$ and the capacitor $C_5$, defining a filter circuit. Thus, it will be seen from FIG. 1 that the power supply line wire $16'$ is connected through the rectifier $D_1$ and the capacitor $C_5$ to the power supply wire $15'$, and the winding of the relay $K_1$ is connected between the junction point $17'$ and the opposite line wire $15'$ through the transistor $Q_4$.

The energization of relay $K_1$ operates switch contacts which may be either of the normally open type or the normally closed type and which may contain multiple poles, as may be necessary. Assume, for example, that the relay $K_1$ is of the normally open type controlling a pair of contacts 18 and 19 which close responsive to the energization of the relay, the contacts 18 and 19 being connected in series between the voltage source and the load. Closure of these contacts occurs at a time illustrated as time point 2 in FIGS. 2 and 3. The time difference between points 1 and 2 is the "on delay" time.

Let it be assumed that subsequent to the time point 2 an increase in source voltage occurs toward a limiting upper level A at a time point 3 in FIG. 2. As will be seen from FIG. 1, the voltage at point $13'$ is the same as at a point 20, the resistors $R_1$, $R_2$ and $R_3$ being connected between said point 20 and the power supply line $15'$. Resistor $R_2$ is a potentiometer, whereby the series resistors $R_1$, $R_2$ and $R_3$ define a voltage divider circuit connected so as to allow the ionization of a neon lamp $NE_3$ to be set at a level corresponding to the high threshold value A. Ionization of the lamp $NE_3$ results in the establishment of forward bias for a transistor $Q_3$, said forward bias being developed across series-connected resistors $R_{11}$ and $R_{10}$, the bias voltage being applied to the base of transistor $Q_3$ through a current-limiting resistor $R_{15}$. Forward bias of transistor $Q_3$ results in capacitor $C_4$ discharging rapidly and lowering the voltage applied to the series branch comprising lamp $NE_4$ and resistor $R_{17}$ to a value below that required to maintain ionization of lamp $NE_4$. This removes the forward bias on transistor $Q_4$ and deenergizes relay $K_1$. The switch action of relay $K_1$ opens the contacts 18–19 and disconnects the high source voltage from the protected electrical appliance, the disconnection taking place at the time point 4 in FIG. 3. The time point 4 is quite close to the time point 3 in FIG. 2.

A portion of the circuit of FIG. 1 comprising resistor $R_4$, capacitor $C_2$, neon lamp $NE_1$, resistor $R_{12}$, resistor $R_{13}$ and transistor $Q_2$ defines a relaxation oscillator that periodically lowers the voltage applied to neon lamp $NE_3$, supplied from the voltage divider circuit $R_1$, $R_2$ and $R_3$. Neon lamp $NE_3$ therefore deionizes during each conduction period of transistor $Q_2$. Source voltages above that of level A at time point 3 and the slightly lower level B at a time point 5 of FIG. 2 will result in neon lamp $NE_3$ again becoming ionized during non-conduction periods of transistor $Q_2$. If, however, the source voltage decreases to a level below that of B at point 5, neon lamp $NE_3$ will deionize with the next conduction period of transistor $Q_2$. Capacitor $C_4$ is again permitted to charge for the "on delay" time, at the end of which relay $K_1$ is energized applying the source voltage to the protected electrical apparatus, for example, at time point 6 of FIG. 3.

Let us assume that subsequent to this time the source voltage decreases toward a value C at a time point 7 of FIG. 2. An adjustable voltage divider branch is provided between the point 20 and power wire 15' comprising resistors $R_5$, $R_6$ and $R_7$, the resistor $R_6$ comprising a potentiometer with its adjustable contact connected to the base of a transistor $Q_1$ through a current-limiting resistor $R_8$. This adjustable voltage divider branch circuit permits the selection of a base to emitter voltage, of transistor $Q_1$, such that the conduction of $Q_1$ is sufficient to cause the voltage drop across resistor $R_9$ and resultant voltage across $NE_2$ to be below the ionization level of $NE_2$. When the source voltage drops below value C at a time-point 7 of FIG. 2, the conduction of transistor $Q_1$ is such that additional current flows in the $R_9$-$C_3$ circuit, permitting $C_3$ to charge to a higher voltage level, and permitting $NE_2$ to ionize. Ionization of $NE_2$ is therefore delayed, with respect to the time of the lower source voltage below value C at time-point 7. If a low source voltage exists for a period of time greater than the charge time of capacitor $C_3$, $NE_2$ will ionize.

Figure 3:
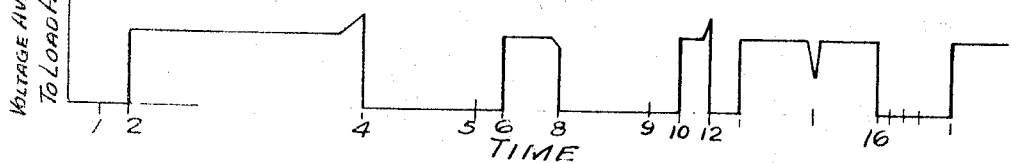
FIG. 3 is a graph showing the interrupted source voltage available to the protected electrical apparatus, employing a device such as illustrated in FIG. 1, when supplied by a source having the voltage variation characteristic shown in FIG. 2.

Similar to the ionization of lamp $NE_3$, the ionization of lamp $NE_2$ results in the deenergizing of the relay $K_1$ and the disconnection of the source voltage, at the time point 8 of FIG. 3, from the protected electrical apparatus.

Ionization of $NE_2$ results in a voltage drop across series-connected resistors $R_{10}$ and $R_{11}$. A portion of this voltage is applied as emitter bias to transistor $Q_1$. This emitter bias serves to shift the operating point of transistor $Q_1$, such that the conduction of transistor $Q_1$ is decreased and the current in $NE_2$, $R_{10}$ and $R_{11}$ is increased. This feed-back arrangement prevents resetting of the system due to an apparent improvement of source voltage due to removing the protected appliance load from the source.

The different threshold levels A and B at time points 3 and 5, as well as the levels C and D at time points 7 and 9 provide a slight amount of circuit hysteresis that prevents cycling of relay $K_1$ at source voltage levels just outside the low and high threshold settings.

Increased source voltages above the level D at time point 9 of FIG. 2 cause neon lamp $NE_2$ to become deionized, and following the "on delay" time previously described, the relay $K_1$ energizes, making the source voltage again available to the protected electrical apparatus, for example, at time point 10 in FIG. 3.

In the event of a high voltage transient E such as that which occurs at the time point 11 in FIG. 2, the relay $K_1$ will become deenergized in the manner previously described, quickly removing the source voltage from the protected electrical apparatus, then, at the time point 12 in FIG. 3.

Short-duration low line voltage transients may occur, for example, at the time points 13 and 15 in FIG. 2. A longer duration source voltage "drop out," for example, that which occurs at the time point 15, will result in capacitor $C_3$ charging sufficiently to permit ionization of neon lamp $NE_2$ and consequently the deenergization of relay $K_1$, removing the source voltage, for example, at time point 16 in FIG. 3, from the protected electrical apparatus.

Short intervals of restoration of adequate source voltage, such as in the short time period 17 in FIG. 2, will not permit the "on delay" timing to be completed, and therefore prevents repeated starting surges of the protected electrical apparatus.

A diode $D_3$ connected across the winding of relay $K_1$ prevents excessive collector voltage on transistor $Q_4$ which might otherwise be present due to the high surge condition developing when relay $K_1$ deenergizes.

Figure 4:
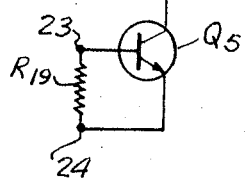
FIG. 4 is a schematic diagram of an auxiliary transistor circuit which may be employed as a means of obtaining higher levels of relay coil current for relatively large magnetic switches, if such large switches are employed to control a load apparatus to be protected by the guard circuit of the present invention.

Terminals 21 and 22 are provided across the coil of relay $K_1$ and terminals 23 and 24 are provided in the emitter return circuit of transistor $Q_4$ for external connections. The terminals 23 and 24 are normally connected by a jumper 25. Additional current amplification circuitry, such as that shown in FIG. 4, can be employed at these terminals to provide additional coil current, as may be required by large magnetic switches. Thus, the jumper 25 may be removed and a resistor $R_{19}$ connected across terminals 23 and 24 and a transistor $Q_5$ may be connected to the coil of relay $K_1$ in the manner shown in FIG. 4 with terminal 23 connected to the base of the transistor and terminal 24 connected to the emitter of the transistor, the collector of the transistor being connected to one terminal of the coil of relay $K_1$ at the terminal 22.

In the foregoing description, an alternating source voltage was considered as being applied to the input terminals 11 and 12 of the device illustrated in FIG. 1. A direct current source voltage may also be used to supply the necessary power for the transistor and neon glow tube circuits. Since the neon glow lamps require ionization voltages of from 60 to 100 volts, source voltages above these values will be required to operate the device. The rectifier diodes $D_1$ and $D_2$ provide reverse voltage protection when direct current source voltages are used.

From the foregoing description, it will be apparent that in operation, when the source voltage is great enough to fire the glow discharge tube $NE_4$ the impedance $R_{17}$ provides a sufficient voltage drop thereacross to provide forward bias on the control electrode of the transistor $Q_4$, whereby to cause energization of control relay $K_1$. However, the circuit operates to provide forward bias on the control electrode of the transistor $Q_3$ connected across the series circuit comprising glow lamp $NE_4$ and impedance $R_{17}$. Therefore when the voltage source is at either the high limit value or the low limit value, as previously described, the series circuit comprising neon lamp $NE_4$ and impedance $R_{17}$ is substantially shunted, removing the forward bias from transistor $Q_4$ and causing the relay $K_1$ to become deenergized.

Many useful applications of the device will be obvious to those skilled in the art. For example, a typical application would be in connection with units containing electric motors employed under service conditions where the source voltage lingers below a fixed minimum level. The delay and hysteresis features of the device of the present invention are especially important, since they require correction of source voltage levels before normal operation of the protected electrical apparatus is restored.

Another useful application would be for the control of an auxiliary power plant. In this application, contacts would be closed to complete the power plant's starting circuit. A similar device could be used to sample the power plant's output voltage and continue to provide protection of associated electrical appliances.

The following is a listing of a number of important features and advantages of the device of the present invention:

1. It provides continuous sampling of low, normal and high source voltage levels, regardless of the "on" or "off" status of the protected electrical apparatus.

2. It operates to disconnect the protected electrical apparatus from a low source voltage that exists below a preset level for a predetermined period of time.

3. It operates to disconnect the protected electrical apparatus from a high source voltage when the source voltage attains a preset level.

4. It operates to automatically reconnect the protected electrical apparatus only when the source voltage is within the preset low and high voltage limits for a predetermined period of time.

5. The device is operable from either alternating or direct current voltage sources.

6. The device operates to compare the sampled source voltage to neon glow tube reference voltages, establishing an inexpensive and improved threshold sensing point.

7. The device is arranged to allow auxiliary semiconductor circuitry to be readily utilized for current amplification requirements of large magnetic switch coils.

8. The device requires no external power supply other than the source voltage, and the device is adapted to operate satisfactorily over wide variations of this source voltage.

9. The device embodies one basic unit, which can be expanded however, to provide protection for any electrical apparatus designed to operate from standard commercial or auxiliary voltage sources.

While a specific embodiment of an improved line voltage monitoring and control system has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a control system, a control relay having switch contacts for connecting a load device to a source of voltage, and means for actuating said relay comprising circuit means including a series transistor connecting said relay to said source, said transistor having a control electrode, a bias voltage branch circuit connected across said source, said branch circuit including a glow discharge lamp and an impedance in series, means connecting the junction between said lamp and impedance to said control electrode, said impedance being sufficient to provide forward bias on said control electrode when the source voltage is great enough to fire said glow discharge lamp, whereby to energize said control relay, means to substantially shunt the series-connected glow lamp and impedance, whereby to deenergize said relay, responsive to a predetermined limit value of source voltage, wherein said shunting means comprises a second transistor connected across said series-connected glow lamp and impedance, said second transistor having a control electrode, and means to provide forward bias voltage to said last-named control electrode responsive to said limit value of source voltage, wherein said means to apply said last-named forward bias voltage comprises a voltage divider impedance branch connected across said source, and circuit means including a second glow discharge lamp connecting a selected point on said voltage divided impedance branch to said last-named control electrode, said selected point corresponding to a predetermined high limit of source voltage, and means to periodically lower the voltage applied to said second glow discharge lamp sufficiently to periodically deionize said second glow lamp.

2. The control system of claim 1, and wherein said means to periodically lower the voltage applied to said second lamp comprises a relaxation oscillator connected across a portion of said voltage divider impedance branch.

3. The control system of claim 2 and the further means to apply forward bias voltage to said last-named control electrode responsive to a predetermined low limit of source voltage.

4. The control system of claim 3, and wherein said further means comprises a second voltage divider impedance branch connected across said source, circuit means including a third glow discharge lamp connecting said last-named control electrode to a selected point on said second voltage divider impedance branch, and a third transistor connected across said third glow discharge lamp, said third transistor having a control electrode connected to said last-named selected point, said last-named selected point providing a conduction level of the third transistor such that the third glow discharge lamp will ionize only at a source voltage below said predetermined low limit.

5. The control system of claim 4, and means to delay ionization of said third glow discharge lamp.

6. The control system of claim 5, and wherein said delay means comprises a series-resistance capacitance branch connected across said second voltage divider impedance branch, with the third glow discharge lamp connected between the resistance-capacitance junction of said resistance-capacitance branch and one terminal of second second voltage divider impedance branch.

7. The control system of claim 1, and delay means comprising a capacitor connected across said series-connected glow lamp and impedance to provide a time delay in applying forward bias voltage to said control electrode.

* * * * *